Patented Feb. 10, 1953

2,628,248

UNITED STATES PATENT OFFICE 2,628,248

1-ALKYL-2-PHENETHYL-6-SUBSTITUTED-CYCLOHEXANONE-3-COMPOUNDS AND PROCESS OF PREPARING SAME

John A. Hogg, Kalamazoo, Mich., assignor to The Upjohn Company, Kalamazoo, Mich., a corporation of Michigan No Drawing. Application October 18, 1951, Serial No. 251,989

10 Claims. (Cl. 260—473)

The present invention relates to novel organic compounds and to a method for the preparation thereof. More specifically, this invention relates to 1 - alkyl-2-(meta-substituted-phenethyl)-6-substituted-cyclohexanone-3 compounds and to a method for the preparation thereof by the reduction of the corresponding cyclohexenone-3 compounds. The present application is a continuation-in-part of my prior-filed copending application Serial 774,171, filed September 15, 1947, now United States Patent No. 2,582,252.

The compounds of the present invention are valuable intermediates in the preparation of more complex organic molecules, such as hexahydrophanthrene compounds, which are active estrogens. In addition, the compounds are useful as plasticizers and in the preparation of synthetic resins.

It is an object of the present invention to provide a novel group of organic compounds. A further object of the invention is the provision of a process for the production of the said novel compounds. Additional objects will become apparent to one skilled in the art to which this invention pertains.

The compounds of the present invention may be represented by the following general formula:

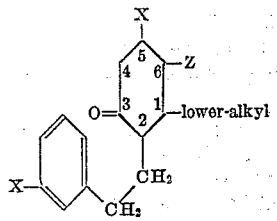

wherein X is selected from methoxy and hydroxy, wherein Y is selected from hydrogen and lower-alkyl, and wherein Z is selected from carboxy and carbalkoxy, the term "lower-alkyl" including methyl, ethyl, propyl, isopropyl, butyl, amyl, hexyl, heptyl, octyl, and like alkyl radicals. When the group in the 6-position is the carbalkoxy group, such group includes, for example, the carbomethoxy, carbethoxy, carbopropoxy, carboisopropoxy, carbobutoxy, carboamyloxy, carbohexoxy, carboheptoxy, carbooctoxy, carbobenzoxy, and the like. Of the alkyl groups in the one position, the methyl group represents the preferred embodiment, although other alkyl groups, such as those mentioned above, are also suitable.

The method of the present invention consists in the catalytic hydrogenation of a selected 1 - alkyl - 2 - (meta-methoxyphenethyl)-6-car- balkoxy-cyclohexene-1-one-3, as with Raney metal, palladium, palladium on charcoal, or like hydrogenation catalysts, with the latter being preferred. While a solvent is not essential, an organic solvent, such as methanol, acetic acid, glacial acetic acid, and especially ethanol may be advantageously employed. The reaction is preferably conducted under a pressure of hydrogen, a hydrogen pressure of about twenty to fifty pounds being suitable. Any suitable temperature between about twenty and eighty degrees centigrade may be employed, with room temperature being entirely satisfactory. The theoretical amount of hydrogen, i. e., one mole, is usually absorbed within a period of about one hour. The compounds thus produced may be separated according to conventional procedure, e. g., as by filtering and removing the solvent, and are usually colorless oils having a fruity odor, convertible by hydrolysis to the corresponding methoxy acid, or, if desired, convertible to the free meta-hydroxy acid by saponifying and to the meta-hydroxy acid ester by saponifying and then reesterifying the carboxy group in the six position, as with a diazoalkane, e. g., diazomethane, diazoethane, diazobutane, and the like.

The 1 - alkyl-2-(meta-methoxyphenethyl)-6-carbalkoxycyclohexene-1-one-3 compounds used as starting materials for the method of the present invention have the following formula:

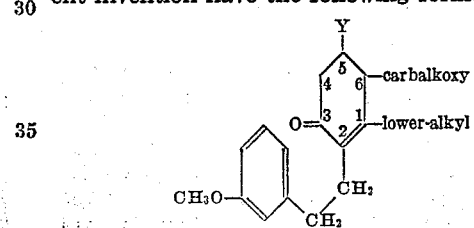

wherein the substituents have the values given previously. These compounds are prepared from an appropriate 1-alkyl-6-carbalkoxycyclohexene-1-one-3, of the formula:

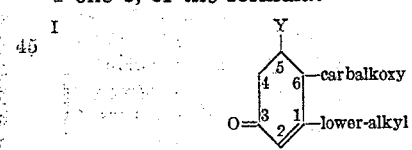

wherein Y is selected from hydrogen and lower-alkyl, lower-alkyl in both instances including methyl, ethyl, propyl, isopropyl, butyl, amyl, hexyl, heptyl, octyl, and the like. Such groups as carbomethoxy, carbethoxy, carbopropoxy, carboisopropoxy, carbobutoxy, carboamyloxy, carbohexoxy, carboheptoxy, carbooctoxy, and the like are included within the scope of the term "carbalkoxy."

These cyclic esters, e. g., 1-methyl-6-carbethoxycyclohexene-1-one-3, are prepared by condensation of formaldehyde with an acetoacetic ester, followed by cyclodehydration and subsequent selective decarbalkoxylation using sodium ethoxide. The esterifying group of the acetoacetic ester appears as the alkoxy part of the C-6 carbalkoxy group in such case, and this compound, wherein Y is hydrogen, the C-1 lower-alkyl group is methyl, and the C-6 group is carbethoxy, is known as Hagemann's ester [Berichte 26, 876 (1893)]. The use of an aldehyde other than formaldehyde introduces an additional substituent Y, which is located at carbon atom five of the ring. The structure of the aldehyde used determines the group Y, and this is restricted only by the nature of available aldehydes [Horning, Denekas, and Field, J. Org. Chem. 9, 547 (1944)]. Y, when other than hydrogen, is preferably an alkyl group of eight carbon atoms or less, and may be, for example, methyl, ethyl, propyl, isopropyl, butyl, amyl, hexyl, heptyl, octyl, and the like.

Variation of the C-1 lower-alkyl group may be accomplished according to the procedure of Mannich and Fourneau [Berichte 71, 2090 (1939)]. This involves reaction of a ketone of the formula:

II 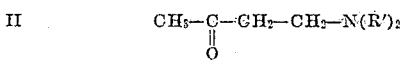

with beta-keto ester of the formula:

III 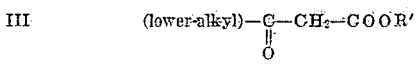

wherein R' is an esterifying radical. The (lower-alkyl) group in the keto-ester III has the values indicated therefor in compound I, and thus, for example, when the lower-alkyl group in compound III is methyl, the C-1 lower-alkyl group in compound I becomes $CH_3-$.

The Hagemann-type ester (I) bearing the desired substituents is reacted with a meta-substituted phenethyl halide of the formula:

IV 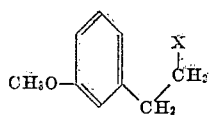

wherein X is a halogen atom, preferably bromine, in the presence of a suitable condensing agent, such as an alkali metal amide or alcoholate. These agents may be, for example, sodamide, sodium hydride, sodium, or potassium, with the latter especially suitable. As medium for the condensation, benzene, xylene, an alcohol such as ethanol or tertiary butanol, and like organic solvents are advantageously employed, with tertiary butanol being preferred. The reactants may be heated together at a temperature between about eighty degrees and about 150 degrees centigrade, usually at the reflux temperature of the particular solvent employed, for a period of about six to fifteen hours. Twelve hours is usually sufficient to allow optimum yields of product. Reaction time will, however, vary with the particular temperature employed and exact nature of the reactants, and shorter or longer periods are sometimes entirely satisfactory. Equimolar proportions of reactants are usually employed. The resulting 1-alkyl-2-(meta-methoxyphenethyl)-6-carbalkoxycyclohexene-1-one-3 compounds are a product of the condensation of the beta-phenethyl halide IV with the 2-position of the cyclohexenone ester I, and may be recovered in conventional manner, e. g., by washing with dilute acid, drying, separating from solvent, and purifying by distillation or the like.

The following examples are given to illustrate the process and products of the present invention, but are in no way to be construed as limiting.

PREPARATION 1.—1-METHYL-2-(M-METHOXYPHENETHYL)-6-CARBETHOXYCYCLOHEXENE-1-ONE-3

Thirteen grams (0.563 mole) of sodium was added portionwise to 250 milliliters of liquid ammonia containing 0.2 gram of hydrated ferric nitrate, with cooling only when necessary to facilitate the speed of addition. The mixture was stirred until the blue color was replaced by gray, whereafter the resulting suspension was cooled in an alcohol-Dry Ice bath, and 102.5 grams (0.563 mole) of Hagemann's ester, 1-methyl-6-carbethoxy-cyclohexene-1-one-3, was added as rapidly as possible with the continued application of the cooling bath. The deep-red reaction mixture was stirred without cooling for twenty minutes, and was then cooled again while 300 milliliters of dry toluene and fifty milliliters of sodium-dried ether were added. The cooling bath was then removed and the mixture stirred two hours at room temperature until substantially all of the ammonia had escaped. The reaction vessel was then heated to boiling, at which point the sodio-derivative appeared as a yellow precipitate.

One hundred and twenty grams (0.563 mole) of m-methoxyphenethyl bromide was added and the suspension refluxed under a nitrogen atmosphere for eighteen hours. The resulting mixture was washed with dilute hydrochloric acid and then with water. The toluene layer was dried over magnesium sulfate, and the toluene removed under vacuum. After a small forerun, distillation of the residue yielded 102 grams (58 per cent) of the desired product boiling at 180–184 degrees centigrade at 0.3 millimeter of mercury pressure.

Anal. Calc. for $C_{19}H_{24}O_4$: C, 72.2; H, 7.58
Found: C, 71.6; H, 7.41

PREPARATION 2.—1,5-DIMETHYL-2-(M-METHOXYPHENETHYL)-6-CARBETHOXYCYCLOHEXENE-1-ONE-3

Five and eight-tenths grams (0.148 mole) of potassium was dissolved in 125 milliliters of anhydrous tertiary butanol and 29.0 grams (0.148 mole) of 1,5-dimethyl-6-carbethoxycyclohexene-1-one-3 was added thereto. After ten minutes, 31.8 grams (0.148 mole) of m-methoxyphenethyl bromide was added and the mixture refluxed under an atmosphere of nitrogen for twelve hours, at the end of which time the solution was neutral. The butanol was then removed under reduced pressure and the residue treated with water and ether. The ether layer was washed with water, dried, and the ether distilled. Final distillation yielded 27.7 grams (56.7 per cent) of the desired 1,5-dimethyl-2-(m-methoxyphenethyl)-6-carbethoxycyclohexene-1-one-3, boiling at 178–195 degrees centigrade at 0.3 millimeter of mercury pressure absolute.

PREPARATION 3.—1-METHYL-2-(M-METHOXYPHENETHYL)-5-ISOPROPYL-6-CARBETHOXYCYCLOHEXENE-1-ONE-3

In the same manner as given for Preparation 2, 7.3 grams (0.17 mole) of potassium, 136 milliliters of tertiary butanol, 38.2 grams (0.17 mole) of 1-methyl-5-isopropyl-6-carbethoxycyclohexene-1-one-3, and 36.6 grams (0.17 mole) of m-methoxyphenethyl bromide were refluxed together for a period of about twelve hours and the desired product, 1-methyl-2-(m-methoxyphenethyl) - 5 - isopropyl-6-carbethoxycyclohexene-1-one-3, boiling at about 188–210 degrees centigrade at 0.3 millimeter of mercury pressure absolute, isolated from the reaction product. The yield of desired compound was fifty per cent of the theoretical.

*Example 1.—1-methyl - 2 - (meta-methoxyphenethyl) -6-carbethoxycyclohexanone-3*

Thirty-three grams (0.104 mole) of the product from Preparation 1, dissolved in 100 milliliters of 95 per cent ethanol, was hydrogenated under 35 pounds pressure using four grams of palladinized charcoal as catalyst. The theoretical amount of hydrogen was absorbed in 45 minutes. After filtration and removal of solvent, there remained 1-methyl-2-(m-methoxyphenethyl)-6-carbethoxycyclohexanone-3, a water-white oil of fruity odor.

Proof of structure was accomplished as follows: this oil was cooled to about −20 degrees centigrade in an alcohol-Dry Ice bath, and eighty milliliters of concentrated sulfuric acid which had been similarly cooled was added thereto. The viscous contents of the flask were stirred as the temperature was allowed to rise slowly, with cooling from time to time maintaining the temperature always below about ten degrees centigrade. After twenty minutes of shaking and stirring, the temperature was allowed to rise to twenty degrees centigrade, whereafter the mixture was poured onto a large excess of cracked ice. The total reaction time was thirty minutes. A light-colored gum, 1-methyl-2-carbethoxy-7-methoxy - 1,2,3,4,9,10 - hexahydrophenanthrene, separated and was extracted with ether.

The ether was removed and the residue hydrolyzed by refluxing for one hour in 200 milliliters of a six per cent solution of potassium hydroxide in 180 milliliters of 95 per cent ethanol and twenty milliliters of water. The alcohol was then removed under vacuum and diluted with water, the water solution washed with ether and acidified with concentrated hydrochloric acid. The free acid came out as an oil which quickly solidified. There was obtained 18.5 grams (65 per cent) of crude acid, melting at 174–178 degrees centigrade, and two recrystallizations from 95 per cent ethanol raised the melting point to 192–193 degrees centigrade.

By the Kahnt-Doisy method, this compound produces the full estrus response in doses of 22.5 gamma.

Anal. Calc. for $C_{17}H_{20}O_3$: C, 75.0; H, 7.35
Found: C, 75.0; H, 7.25

*Example 2.—1 - methyl-2-(meta - hydroxyphenethyl) -6-carboxycyclohexanone-3*

Demethylation of the product of Example 1 with 45 per cent hydrobromic acid yields an oil, 1-methyl-2-(meta - hydroxyphenethyl) - 6 - carboxycyclohexanone-3.

*Example 3.—1 - methyl-2-(meta - hydroxyphenethyl) -6-carbomethoxycyclohexanone-3*

A solution of the product from Example 2 is dissolved in ether and treated with an excess of ethereal diazomethane. The solvent is removed to yield 1-methyl-2-(meta-hydroxyphenethyl) - 6-carbomethoxycyclohexanone-3.

*Example 4.—1,5 - dimethyl - 2 - (meta-methoxyphenethyl) -6-carbethoxycyclohexanone-3*

Fifteen and eight-tenths grams (0.0513 mole) of 1,5-dimethyl-2-(m-methoxyphenethyl) -6-carbethoxycyclohexene-1-one-3 was hydrogenated in ethyl alcohol at forty pounds of hydrogen pressure using palladium on charcoal (1.5 grams of ten per cent palladium on charcoal) as catalyst. When the theoretical amount of hydrogen was absorbed, the catalyst was removed by filtration to give a residue of 1,5-dimethyl-2-(m-methoxyphenethyl) - 6 - carbethoxycyclohexanone-3.

Proof of structure was accomplished as follows: the product was cooled to approximately ten degrees centigrade and treated carefully with forty milliliters of concentrated sulfuric acid, the temperature being maintained below about ten degrees centigrade. This operation demanded one-half hour, whereafter the temperature of the reaction mixture was allowed to rise to room temperature for ten minutes and poured on cracked ice. The 1,3-dimethyl-2-carbethoxy-7-methoxy-1,2,3,4,9,10-hexahydrophenanthrene separated as a gum and was extracted with ether and, after removal of ether, refluxed for 24 hours in alcohol containing four to five equivalents of potassium hydroxide. Alcohol was removed by distillation, the residue diluted with water, and neutral material removed by ether extraction. Acidification of the aqueous layer produced an oil which solidified rapidly and melted below 100 degrees centigrade. Recrystallization of the crude 1,3 - dimethyl - 2 - carboxy - 7 - methoxy - 1,2,3,4,9,10-hexahydrophenanthrene from ethanol raised the melting point to 173–174.5 degrees centigrade.

*Example 5.—1,5-dimethyl - 2 - (meta - hydroxyphenethyl) - 6 - carboxycyclohexanone - 3 and methyl ester thereof*

The product from Example 4, is hydrolyzed with hydrobromic acid in acetic acid to produce 1,5-dimethyl - 2 - (meta - hydroxyphenethyl) -6- carboxycyclohexanone-3, and this compound treated with an excess of diazomethane in ether. Removal of solvent is productive of the desired compound, 1,5-dimethyl-2-(meta-hydroxyphenethyl) -6-carbomethoxycyclohexanone-3.

*Example 6.—1 - methyl-2-(meta - methoxyphenethyl) -5-isopropyl - 6 - carbethoxycyclohexanone-3*

In the same manner as given for Example 4, 24.3 grams of 1-methyl-2-(m-methoxyphenethyl) -5-isopropyl - 6 - carbethoxycyclohexene - 1-one-3 was hydrogenated under forty pounds of hydrogen pressure with 2.5 grams of palladium on charcoal catalyst in 100 milliliters of ethanol to produce 1-methyl-2-(m-methoxyphenethyl) - 5-isopropyl - 6 - carbethoxycyclohexanone-3. As proof of structure, this compound was cyclized by treatment with 65 milliliters of concentrated sulfuric acid at a temperature below about ten degrees centigrade. Potassium hydroxide (8.75 grams) in 75 milliliters of ethyl alcohol was added to the cyclization product, 1-methyl-2-carbethoxy-3-isopropyl-7-methoxy - 1,2,3,4,9,10-hexahydrophenanthrene, the mixture refluxed and the product worked up as in Example 4. The free acid, after crystallization from methanol, was a white solid melting at about 174 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A 1 - methyl-2-(meta-X-phenethyl)-5-Y-6-Z-cyclohexanone-3 of the formula:

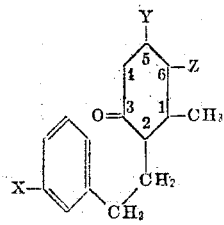

wherein: X is selected from the group consisting of methoxy and hydroxy; Y is selected from the group consisting of hydrogen and lower-alkyl; and Z is selected from the group consisting of carboxy and carbalkoxy.

2. 1 - methyl - 2-(meta-methoxyphenethyl) -6-carbethoxycyclohexanone-3.

3. 1,5 - dimethyl-2-(meta-methoxyphenethyl) - 6-carbethoxycyclohexanone-3.

4. 1 - methyl - 2-(meta-methoxyphenethyl) -5-isopropyl-6-carbethoxycyclohexanone-3.

5. The process which includes: hydrogenating, under a pressure of hydrogen and with a hydrogenation catalyst, the olefinic double bond of a compound of the formula:

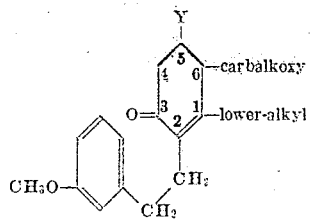

wherein: Y is selected from the group consisting of hydrogen and lower-alkyl, until about one mole of hydrogen is absorbed, to produce a compound of the formla:

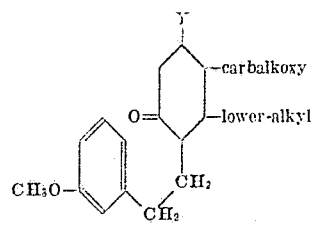

wherein Y has the value given below the previous formula.

6. The process of claim 5, wherein the hydrogenation is with hydrogen and a palladium on charcoal catalyst.

7. The process of claim 5, wherein the hydrogenation is conducted at a temperature between about 20 and 80 degrees centigrade.

8. The process of claim 5, wherein the product is thereafter saponified by reaction with an alcoholic base and neutralized to produce the 6-carboxylic acid.

9. 1 - methyl - 2-(meta-hydroxyphenethyl) -6-carboxycyclohexanone-3.

10. 1,5 - dimethyl - 2 - (meta-hydroxyphenethyl) -6-carboxycyclohexanone-3.

JOHN A. HOGG.

No references cited.